United States Patent [19]
Scarpa et al.

[11] 3,920,134
[45] Nov. 18, 1975

[54] DROP LOADER
[75] Inventors: Eric W. Scarpa, Cincinnati, Ohio; Robert J. Weichhand, Fort Wright, Ky.
[73] Assignee: R. A. Jones & Co. Inc., Covington, Ky.
[22] Filed: July 24, 1974
[21] Appl. No.: 491,313

[52] U.S. Cl. .................... 214/43; 53/251; 198/35
[51] Int. Cl.² ........................................ B65G 67/04
[58] Field of Search ............ 214/43; 198/35; 53/251

[56] References Cited
UNITED STATES PATENTS
3,282,585  11/1966  Dieter ........................... 53/251 X
3,805,944  4/1974   Yuryan ............................ 198/20 R Primary Examiner—Travis S. McGehee
Attorney, Agent, or Firm—Wood, Herron & Evans

[57] ABSTRACT

Apparatus for loading multiple pouches into a continuously moving product bucket in which pouches are fed single file from a form-fill-seal machine, diverted into two lanes and deposited into a collector in stacks of two or more. The stack of pouches is dropped into a loader having trap doors and means for moving the loader in the direction of and in approximately the speed of the moving product bucket. At a predetermined time the loader, overlying a product bucket, is moved in the direction of the product bucket and simultaneously its trap doors are opened to drop the stack of pouches into the product bucket.

10 Claims, 7 Drawing Figures

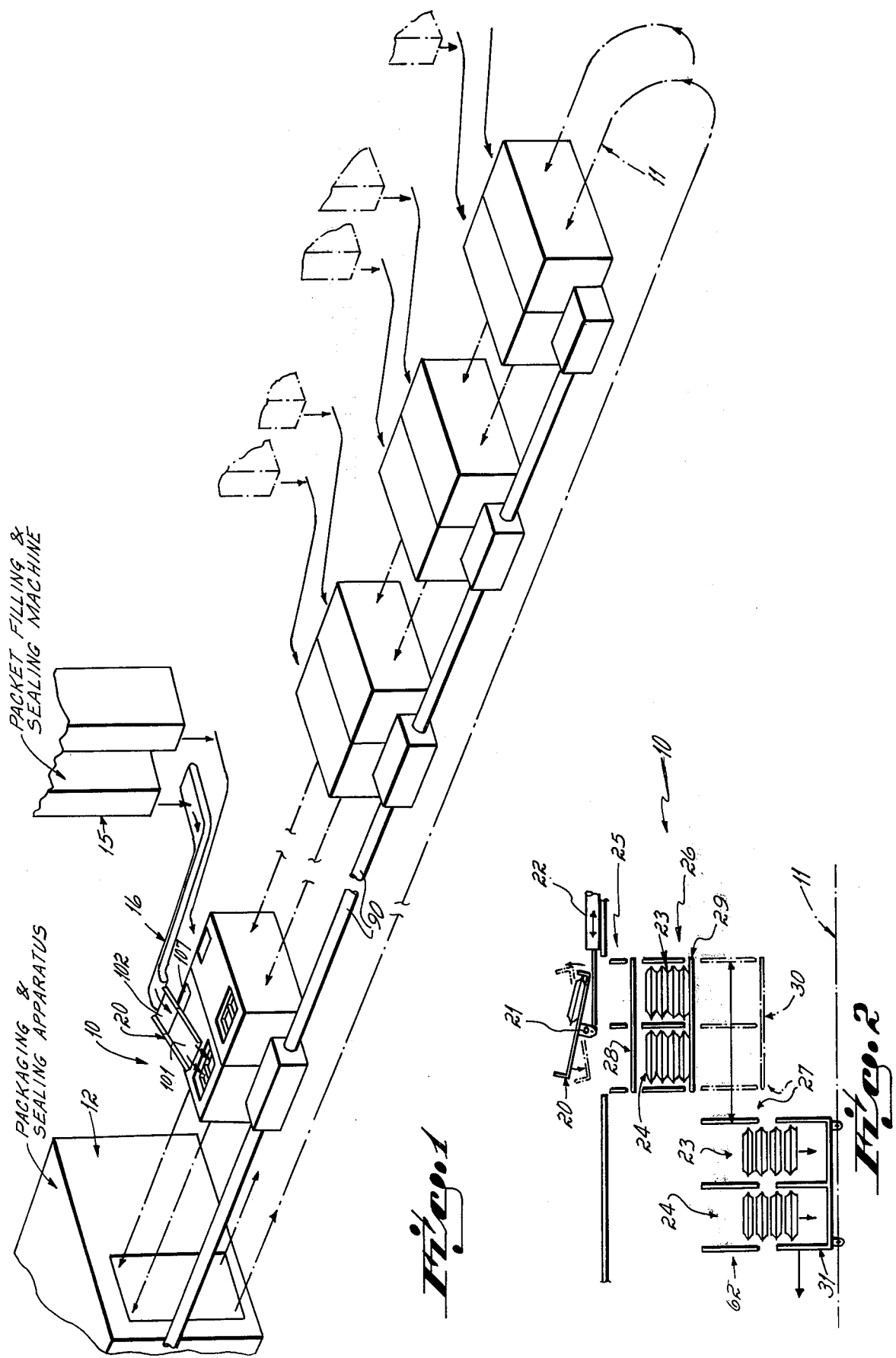

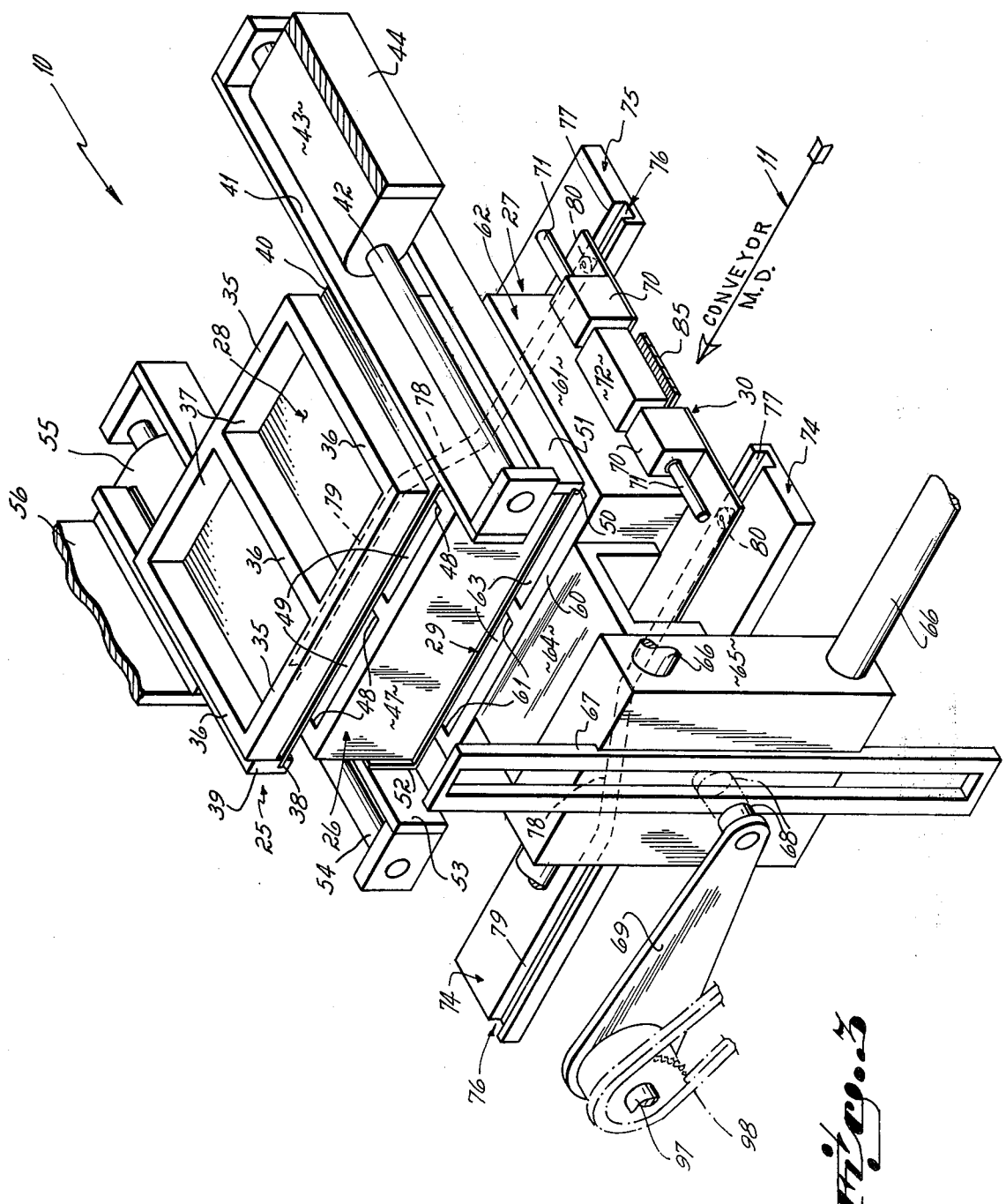

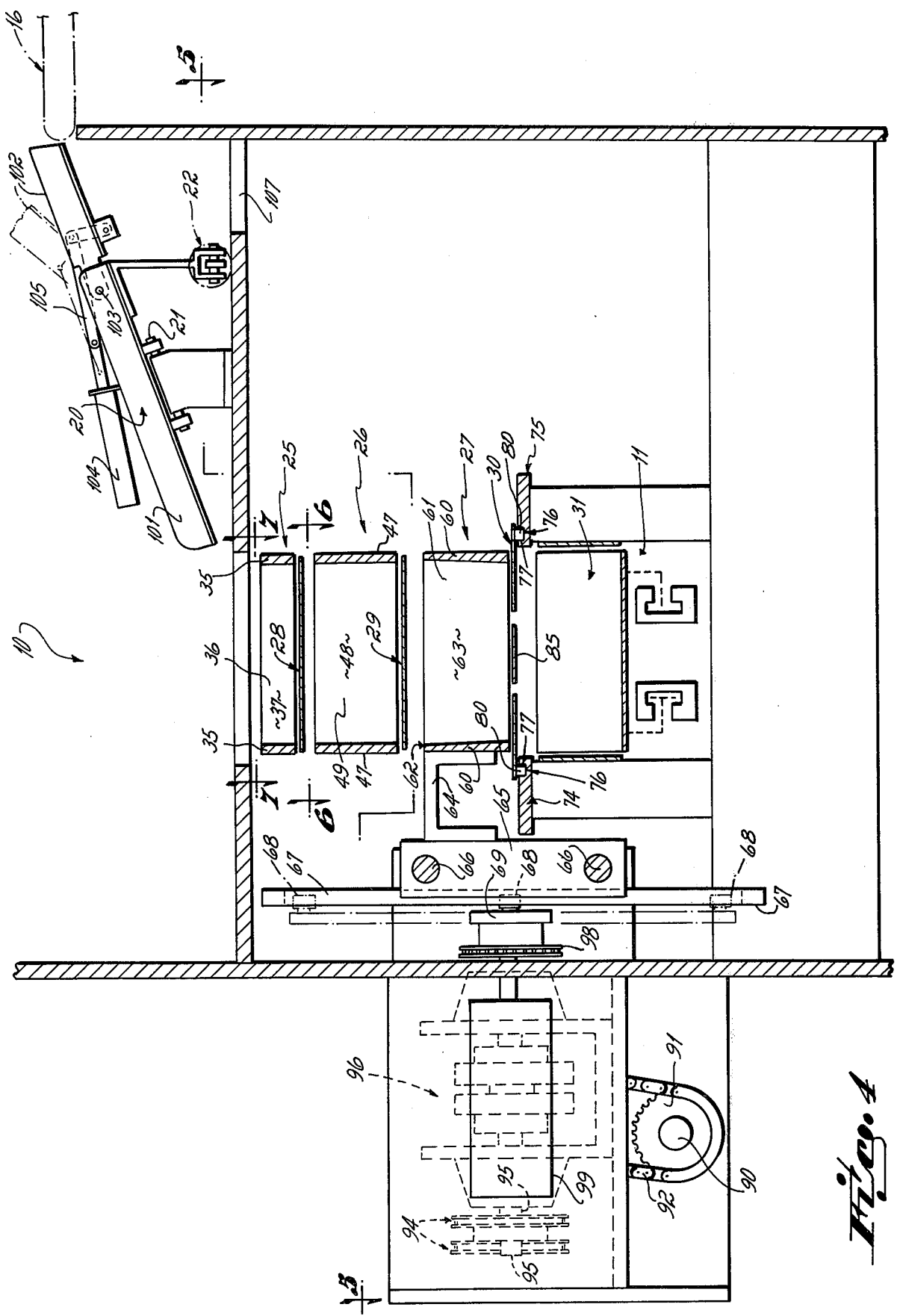

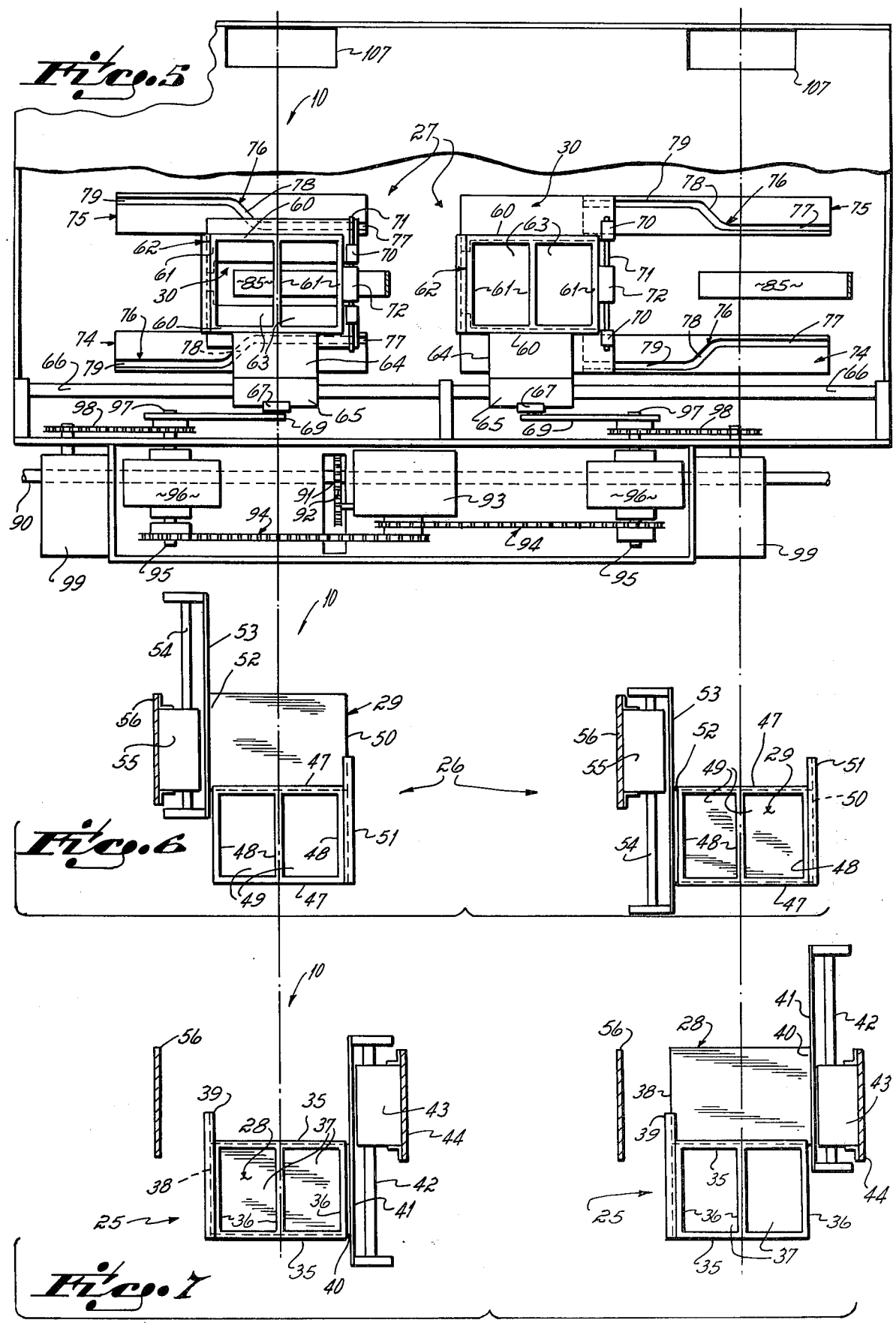

DROP LOADER

This invention relates to transfer apparatus for loading one or more stacks of pouches into a continuously moving product bucket.

Certain form-fill-seal machines, that is, machines for making pouches, operate rather slowly. Cartoners which are designed to load stacks of filled pouches into cartons are designed to operate at high speeds. The manufacture of a pouched product requires apparatus to load pouches formed on a slow form-fill-seal machine into cartons on a high speed cartoner in order to take advantage of the high speed capabilities of the cartoner.

The product manufacturer has had some alternatives but none of them particularly desirable. For example, the pouches can be loaded into the product conveyor of the high speed cartoner by hand, but this introduces a substantial labor factor into the cartoning operation. It is also possible to load the pouches into the product buckets using a complex floating bucket mechanism wherein buckets are held in a loading station and then are captured by an endless chain to be brought up to the speed of the product buckets and then transferred from the initial loading buckets into the product buckets. This system has, among others, the disadvantage of requiring rather complex mechanisms to effect the transfer, these complex mechanisms being expensive and requiring high maintenance costs.

It has been an objective of the invention to provide a loading or transfer mechanism wherein pouches are received from a single form-fill-seal machine, are stacked in a desired pattern, and are thereafter dropped into a continuously moving product bucket. The concept of dropping stacked pouches into a continuously moving product bucket gives rise to the problem of providing assurance that all of the pouches in the stack will be properly received in the product bucket without being hung up on either the leading or trailing edge of a product bucket wall. The problem is accentuated as the speed of the cartoner is increased.

To solve the problem, the invention contemplates the receiving and accumulating of the pouches in the desired pattern and imparting the pouches a horizontal component of motion in the direction of the product bucket and thereafter dropping the pouches into the product bucket when the horizontal speed is approximately that of the product buckets. More specifically, the invention provides a loader having as its bottom wall a pair of trap doors. The loader is mounted for reciprocation over the product bucket conveyor and is adapted to be reciprocated, through a driving connection, to the cartoner machinery from a loading position in a downstream direction and then back to the loading position. During the motion of the loader in the downstream direction, the trap doors are rapidly cammed open to drop the pattern of pouches into a product bucket.

The invention further contemplates a stationary collector overlying the loader when it is in its upstream loading position, the collector receiving a full pattern of stacked pouches which it drops vertically into the loader. The combination of the stationary collector and movable loader permits the collector to receive pouches during the time that the loader is reciprocating to dump its pattern into the product buckets, thereby increasing the speed and efficiency of the transfer mechanism.

The invention also contemplates the use of a trap door interrupter overlying the collector, the interrupter being thrust over the collector for the brief period during which the collector is dropping pouches into the loader. Thus, the interrupter holds up the flow of one or two of the pouches into the collector to give the collector time to drop the pattern into the loader.

Another objective of the invention has been to provide a system for filling a fast moving cartoner with multiple transfer machines of the type described above, including controls to cause a load to be transferred into a preselected one of a number of product buckets on a conveyor chain.

Another objective of the invention has been to provide for malfunctions of the system, the invention providing a diverter to cause a uninterrupted flow of pouches to bypass the transfer apparatus when the conditions of operation are such that the transfer apparatus is loaded and awaiting a preselected product bucket into which to transfer its load.

Another objective of the invention has been to provide for the use of guillotine trap doors for the interrupter and for the bottom of the collector with means to provide for their economic and safe operation. These means include the use of linear electric motors to cause the reciprocation of the doors, the motors operating rapidly but under a low enough pressure to avoid injury either to the hands of an operator or to the product which might get caught in the trap doors.

Several objectives and features of the invention will become more readily apparent from the following detailed description taken in conjunction with the accompanying drawings in which:

FIG. 1 is a diagrammatic perspective view of the invention feeding cartoning apparatus;

FIG. 2 is a diagrammatic view partly in section illustrating the operation of the invention;

FIG. 3 is a perspective view of the loading mechanism;

FIG. 4 is a side elevational view partly in section of the loading mechanism;

FIG. 5 is a cross-sectional view taken along lines 5—5 of FIG. 4;

FIG. 6 is a cross-sectional view taken along lines 6—6 of FIG. 4;

FIG. 7 is a cross-sectional view taken along lines 7—7 of FIG. 4.

GENERAL ORGANIZATION AND OPERATION

Referring to FIG. 1, a loading mechanism of the present invention is indicated at 10, the loading mechanism 10 being one of ten units mounted in spaced relation along the length of a product bucket conveyor 11 which feeds products into cartoning apparatus 12. Each loading mechanism 10 is fed by filling machine 15. While only two of the apparatus 15 are shown, it is to be understood that ten filling machines would be employed, each feeding a separate loading unit. For that purpose, each machine 15 has an endless belt conveyor 16 which receives filled pouches from the filling machine and feeds them to the loader 10.

It should be understood that the speed of the cartoner is such as to accommodate ten filling machines. The function of the loader 10 of the invention is to enable the output of a filling machine to be stacked within the loader and dropped into the rapidly and continuously moving pockets of the conveyor 11 which feeds into the cartoning apparatus.

While the loader of the invention may be employed to drop a single article into a continuously moving product bucket, it is most advantageously used in dropping stacks of articles into the product buckets. In the illustrated form of the invention, two stacks of four pouches will be loaded into each product bucket.

The manner in which the pouches are stacked and thereafter loaded is illustrated generally in FIGS. 1 and 2. The pouches are fed to the loader 10 from the endless belt 16 by a chute 20. As best shown in FIG. 2, the chute 20 is pivotally mounted at 21 and is shiftable from the full line position to the broken line position by a double-acting piston and cylinder combination 22. When the chute is in the full line position, pouches will slide to the right side of the loader and when the chute is shifted to the broken line position, pouches will be fed to the left side of the loader.

The loader has three sections, namely, an interrupter section 25, a collector section 26 and a loader section 27. The interrupter section has a reciprocating trap door 28 which is operable to interrupt the flow of pouches to the collector section 26 only for a brief period during which the collector section 26 is dropping its collected pouches into the loader section 27, as will be described below. Therefore, during substantially the entire operation of the unit 10, the interrupter door 27 is in a withdrawn position, permitting pouches to be fed directly into the collector section 26.

The collector section 26 has a reciprocating trap door 29 similar to the reciprocating door 28 of the interrupter section. The door 29 is normally closed throughout the operation of the unit, the door being opened only briefly to drop each load of eight pouches into the loader section, whereupon it is closed again.

The loader section 27 has a pair of reciprocating trap doors 30. The loader section also has associated with it a mechanism for reciprocating it from the broken line position to the full line position during which pouches are dropped into a product bucket 31 mounted on conveyor 11 and continuously moving below the loader section. The trap doors are associated with a cam mechanism to be described below which cause them to spread apart transversely as the loader section is moved forward from the broken line position to the full line position, thereby dropping the load of stacked pouches from the loader section into the product bucket 31.

Controls are provided to initiate the operation of the loader section. These include a bucket identification control tied to conveyor 11 which determines that the proper bucket is in approximately the right position with respect to the loader 10, bearing in mind that each loader 10 feeds only one out of ten buckets. Another control such as an electric eye directed on the bucket determines that the bucket is in the proper position to receive a stack of pouches. This control accommodates any stretching in the conveyor 11 over its great length. Another control is tied to a counter associated with the loader to permit the loader to operate only when a full count (eight in the described embodiment) is in the loader section 27.

The operation of the mechanism generally is as follows:

Pouches being fed single file from the filling machine 15 are fed first to one side of the collector section, then to the other until two stacks of four are counted. At that point, the door 28 of the interrupter section 25 is thrust over the collector section 26 to interrupt the flow of pouches to the collector. As soon as the interrupter door is closed, the collector section door 29 is opened to drop the collected load of eight pouches into the loader section. The controls described above determine that the appropriate bucket into which the stack is to be dropped has moved to the desired position below the loader. At that time the mechanism for reciprocating the loader is energized. At that time the load in the loader section 27 is moved rapidly, at approximately the speed of the product bucket 31 beneath it, in the direction of motion of the product bucket, and the two trap doors 30 are cammed apart to drop the load in the product bucket. After dropping the load, the loader section is returned to its original broken line position below the collection section to await receipt of another load.

The Loader Unit

Referring to FIGS. 3 and 4, the interrupter section 25 of the loader unit 10 has longitudinal guides 35 and transverse guides 36 forming two pockets 37 for the receipt of pouches. The trap door 28 underlying the pockets 37 is slidably mounted at one edge 38 in a bar 39. The other edge 40 is fixed to a U-shaped bracket 41 mounted on a rod 42 forming the armature of a linear motor 43. The linear motor 43 is fixed to a bracket 44 mounted on the frame of the apparatus. The linear motor 43 is a direct current electrical motor whose armature reciprocates rather than rotates and is particularly useful for reciprocating the trap door 28, for it can cause its armature to move very swiftly from a closed position to an open position, and by reversing the direction of the current, to return the armature from an open position to a closed position, all with very little force. Thus, the motor is suited for the reciprocation of the light trap door but minimizes the possibility of injury to the pouches or hands of the operator should they inadvertantly be in the path of movement of the door.

The collector section 26 is similarly formed with longitudinal walls 47 and transverse walls 48 to form two pockets 49. The pockets 49 are of greater depth then the interrupter pockets 37, for they function to collect a stack of several pouches whereas the interrupter pockets only function during the brief period of time that the collector section is dropping its load into the loader section.

The collector section trap door 29 is mounted and operated similarly to that of the interrupter section. One edge 50 is slidable in a slot of a bar 51. The other edge 52 is fixed to a U-shaped bracket 53 mounted on a rod 54 forming the armature of a linear motor 55. The linear motor is mounted on a bracket 56 also fixed to the frame of the apparatus. Depending upon the direction of the dc current applied to the linear motor 55, the armature 54 and the trap door which it carries will be shifted to open or closed position.

The loader section 27 has longitudinal walls 60 and transverse walls 61 to form a loader box 62 having two pockets 63 for the receipt of two stacks of pouches from the collector section. One of the longitudinal walls 60 is connected by a U-shaped bracket 64 to a block 65 slidably mounted on rods 66 which form ways supporting the loader box 62 for reciprocatory movement. The block 65 carries a vertical slide 67 which is engaged by a stub shaft 68 mounted on a rotatable arm 69. Rotation of the arm 69 through a single revolution causes the stub shaft 68 to slide up and down the slide 67, thereby thrusting the block 66 and the loader box 62 first in a longitudinal direction in the direction of the product bucket conveyor and then in a return direction to the loading position illustrated in FIG. 3.

The box 62 carries its trap doors 30. Each trap door 30 is fixed to a block 70 at the forward and rearward ends of the box 62, each block 70 being slidably mounted on a rod 71. The rod 71 is fixed to a bracket 72 mounted on a transverse wall of the box 62.

Two cam plates 74 and 75 are fixedly mounted below the box 62. Each has a cam track 76 which has an upstream longitudinal section 77, an intermediate diverging section 78 and a downstream longitudinal section 79. Each door 30 carries a follower 80 which rides in a respective track. Thus, when the box 62 is shifted in a downstream direction, the followers riding in their respective tracks maintain the doors 30 in a closed position for a first portion of the excursion in sections 77 and then open the doors as the followers ride in the diverging sections 78 of the cam track. After being opened, the doors are maintained open as the followers ride in the downstream longitudinal sections 79 of the track. The opposite path is followed as the box is returned to its original position through the continued rotation of the arm 69.

It will be observed from FIGS. 3 and 5 that in the closed position the doors 30 are slightly spread apart and a fixed tongue 85 is located between them. The tongue underlies both the loader pockets 63 when the box 62 is in its loading position. However, when the box has been reciprocated to the point at which the trap doors begin to diverge, both pockets will have cleared the tongue 85. The use of the tongue 85 permits a shorter reciprocating stroke for the doors and hence a narrower cam track plate 74, 75.

A Mechanism for Reciprocating the Loader Section

As shown in FIG. 1, a common drive shaft 90 extends from the cartoner 12 through all of the loading units. Referring to FIGS. 4 and 5, at each pair of adjacent loading units 10, a sprocket 91 is fixed to the drive shaft 90 and through a chain 92 is connected to a gear box 93 common to the two side-by-side loader units 10 (FIG. 5). The output of the gear box 91 is connected by chain and sprocket systems 94 to the input shaft 95 of a clutch and brake unit 96 for each loader unit. Referring to FIG. 4, a clutch and brake 96 is adapted to connect the input shaft 95 to an output shaft 97.

The output shaft 97 is directly connected to the rotatable arm 69 which reciprocates the box 62 during the dripping of the stacks of pouches into the product buckets. The output shaft 97 is also connected through a chain 98 to a control box 99 containing certain cam operated controls for the system.

Diverter Section

If at the time of loading a stack into a product bucket, the counter has determined that the count in the collector is one or more pouches short, the controls will prevent the normal cycling of the machine, wherein the motor section would drop its stack and the collector section would drop its stack into the loader section. Instead, the cycle is passed and the appropriate product bucket passes by the loader 10 empty. When a sufficient number of pouches have been received in the collector a continued supply of pouches would obviously pile up at the loader. Therefore, the invention provides a diverter which is best illustrated in FIG. 4. From FIG. 4 it can be seen that the chute 20 is formed by a lower section 101 and an upper section 102 which is pivoted at 103 to the lower section. A piston and cylinder 104 is fixed to the lower section 101 and is connected by a pvioted link 105 to the upper section at 106.

A control which deetects the need to interrupt the flow to the loader section causes the piston and cylinder 104 to swing the upper section 102 from the full line position to the broken line position. When the upper section is in the broken line position it can be seen that pouches moving along the belt conveyor 16 will drop through a hole 107 alongside the loader where they can be accumulated until the loader is ready to continue its regular cycle of operations.

Operation

In the normal operation of the invention pouches are fed from the form-fill-seal machine along the belt conveyor 16 in single file to the loader 10. At the loader 10 the pouches slide down the chute 20 which is cocked to the left and then to the right with each succeeding pouch. As the pouches are fed down the chute, they are counted.

The chute drops the pouches first into one of the pockets 49 of the collector section 26 and then to the other pocket 49 of the collector section 26 until two stacks of four are accumulated. When a group of eight pouches has been accumulated the interrupter trap door 28 is thrust across the bottom of the interrupter section 25 through the energization of the linear motor 43. Substantially simultaneously, linear motor 55 associated with the collector section trap door 28 is energized to withdraw the trap door 29 thereby permitting the two stacks to drop into the loader section 27. As soon as the stacks are dropped, the trap door 29 is returned to its closed position and the interrupter trap door 28 is returned to its open position. Upon return of the trap door 28 to its open position the one or two pouches collected are dropped into the collector section and the flow of pouches to the collector section continues until two stacks of four are accumulated.

At some point during the cycle of operations, as determined by the controls described above, while the collector section is accumulating a new stack of pouches, the clutch and brake mechanism 96 is energized to connect the drive shaft 90 through the transmission system described above to the rotary arm 69. The arm 69 makes a complete revolution to reciprocate the loader box 62 first in the machine direction and then back to the rest position below the collector section. In the excursion in the machine direction the cam tracks 76 and followers 80 cause the trap doors 30 to spread open as the box 62 is moving in the machine direction at approximately the speed of the product buckets. Upon opening of the doors 30 the stacks of pouches are dropped into the product buckets. When a complete revolution of the arm 69 is made, returning to the arm illustrated in section 3, the clutch and brake are operated to release the clutch and open the brake to hold the loader section in its rest position.

We claim:

1. In apparatus for loading articles into product buckets of a conveyor moving continuously with respect to a fixed base, the combination comprising,
   a loader including transversely slidable trap doors overlying said conveyor,
   means for longitudinally reciprocating said loader over said conveyor.
   cam means between said base and said doors for sliding said doors apart to drop articles into product buckets as said loader is moving in the direction of said conveyor.

2. Apparatus as in claim 1 further comprising,
   a fixed collector overlying said loader,
   means for supplying a plurality of articles to said collector,
   means for dropping said articles from said collector into said loader when a predetermined number of articles has been supplied to said collector.

3. Apparatus as in claim 2 further comprising,
   an interrupter located between said supplying means and said collector,
   means for interposing said interrupter in the flow of articles from said supplying means during the dropping of articles from said collector to said loader.

4. Apparatus as in claim 3 in which said interrupter includes a trap door which is normally open,
   means for closing said trap door after said predetermined number of articles has been supplied to said collector.

5. Apparatus as in claim 2 in which said supplying means includes a chute adapted to receive articles from a single incoming file
   the discharge end of said chute overlying said interrupter,
   means for cocking said chute from side-to-side over said collector to drop two side-by-side stacks of articles into said collector.

6. Apparatus as in claim 1 in which said cam means comprises
   a cam plate on each side of said loader and having cam tracks diverging in the direction of said conveyor movement, and,
   cam rollers on said trap doors, said rollers being received in said tracks.

7. Apparatus as in claim 1 in which said reciprocating means comprises drive means for moving said loader in the direction of said conveyor, returning said loader to its original position, and holding said loader in its original position.

8. Apparatus as in claim 2 in which said dropping means comprises
   a trap door mounted for reciprocation below said collector,
   and a linear motor having an armature connected to said trap door for reciprocating said trap door.

9. In apparatus for loading articles into product buckets of a continuously moving conveyor,
   a loader comprising
   a loader box mounted for reciprocation over said conveyor, said loader having trap doors openable as said loader is moving in the direction of said conveyor
   a fixed collector section located over said loader box for accumulating a load of pouches to be dropped into said loader box, said collector section having a trap door for retaining and releasing said pouches, and
   an interrupter section overlying said collector section, said interrupter section having a trap door for releasing and retaining pouches.

10. In apparatus for loading articles into product buckets of a conveyor moving continuously with respect to a fixed base, the combination comprising,
    a loader overlying said conveyor and having article supporting doors which are movable between open and closed positions,
    means for depositing articles on said doors,
    means for longitudinally reciprocating said loader over said conveyor,
    and means for moving said doors to open position to drop articles into said product buckets as said loader is moving in the direction of said conveyor.

* * * * *

UNITED STATES PATENT OFFICE
CERTIFICATE OF CORRECTION

PATENT NO. : 3,920,134
DATED : November 18, 1975
INVENTOR(S) : Eric W. Scarpa, Robert J. Weichhand It is certified that error appears in the above-identified patent and that said Letters Patent are hereby corrected as shown below:

Column 1, line 45, after "imparting," insert -- to --

Column 2, line 18, after "cause," a should be -- an --

Column 5, line 56 - "dripping" should be -- dropping --

Column 6, line 11, "deetects" should be -- detects --

Column 6, line 38, "trap door 28" should be -- trap door 29 --

Signed and Sealed this ninth Day of March 1976

[SEAL]

Attest:

RUTH C. MASON
Attesting Officer

C. MARSHALL DANN
Commissioner of Patents and Trademarks